United States Patent
Osakabe

(10) Patent No.: US 8,964,267 B2
(45) Date of Patent: Feb. 24, 2015

(54) IMAGE READER DETECTING LEADING OR TRAILING END DOCUMENT SHEET IN RESPONSE TO CHANGE IN LIGHT RECEIVING STATE

(75) Inventor: Yoshinori Osakabe, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 708 days.

(21) Appl. No.: 13/034,400

(22) Filed: Feb. 24, 2011

(65) Prior Publication Data
US 2011/0211237 A1 Sep. 1, 2011

(30) Foreign Application Priority Data
Feb. 26, 2010 (JP) .................................. 2010-042578

(51) Int. Cl.
*H04N 1/04* (2006.01)
*H04N 1/203* (2006.01)
*H04N 1/00* (2006.01)

(52) U.S. Cl.
CPC ......... *H04N 1/00681* (2013.01); *H04N 1/2032* (2013.01); *H04N 1/203* (2013.01); *H04N 1/00745* (2013.01); *H04N 1/00702* (2013.01); *H04N 1/00737* (2013.01); *H04N 1/00755* (2013.01)
USPC ............ 358/498; 358/474; 358/471; 358/400

(58) Field of Classification Search
USPC .................................. 358/498, 474, 471, 400
See application file for complete search history.

(56) References Cited

U.S. PATENT DOCUMENTS

| | | | |
|---|---|---|---|
| 5,463,451 A | 10/1995 | Acquaviva et al. | |
| 5,592,576 A | 1/1997 | Hayashi | |
| 7,796,310 B2 | 9/2010 | Hasegawa et al. | |
| 2002/0039207 A1 | 4/2002 | Kanda | |
| 2006/0023267 A1 | 2/2006 | Ikeno et al. | |
| 2007/0122219 A1* | 5/2007 | Hui ............................... 399/370 |
| 2009/0109500 A1* | 4/2009 | Hasegawa et al. ............ 358/474 |
| 2010/0060954 A1 | 3/2010 | Ikeno et al. | |

FOREIGN PATENT DOCUMENTS

| | | |
|---|---|---|
| JP | H02-131067 A | 5/1990 |
| JP | H05-80066 U | 10/1993 |
| JP | 09-284506 A | 10/1997 |
| JP | 2000-233847 A | 8/2000 |
| JP | 2002-111977 | 4/2002 |
| JP | 2002-259724 A | 9/2002 |
| JP | 2006-065289 A | 3/2006 |
| JP | 2009135914 A | 6/2009 |

OTHER PUBLICATIONS

JP Office Action dtd Mar. 26, 2013, JP Appln. 2010-042578, English translation.
Notice of Allowance received in corresponding U.S. Appl. No. 13/035,071 mailed Sep. 24, 2013.
Notification of Reasons for Rejection issued in Japanese Patent Application No. 2010-042579 mailed Mar. 19, 2013.

* cited by examiner

*Primary Examiner* — Martin Mushambo
(74) *Attorney, Agent, or Firm* — Banner & Witcoff, Ltd.

(57) ABSTRACT

An image reader is provided, which includes a light guide unit forming an optical path to guide light emitted by a first light emitting portion of a first reading unit to a second light receiving portion of a second reading unit, which optical path passes across a feeding path in a detection position such that a document sheet passing through the detection position on the feeding path blocks the light on the optical path, and a controller determining that a leading end or a trailing end of the document sheet passes through the detection position in response to detecting a change in a light receiving state of the second light receiving portion when the document sheet passes through the detection position with the first light emitting portion emitting light and a second light emitting portion of the second reading unit not emitting light.

13 Claims, 11 Drawing Sheets

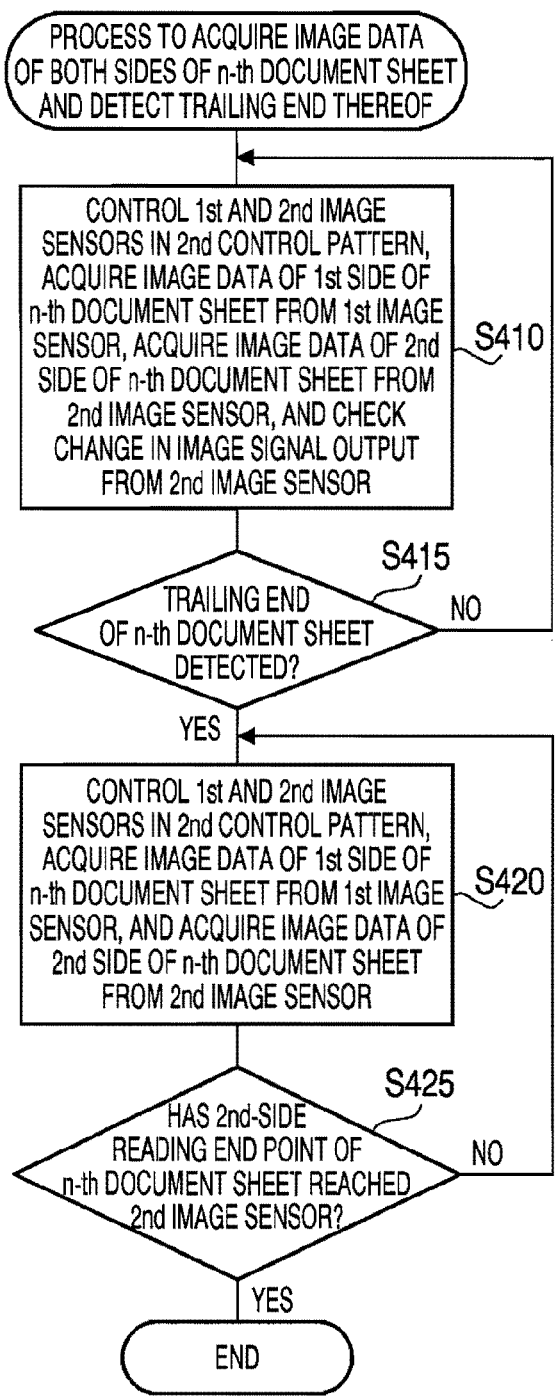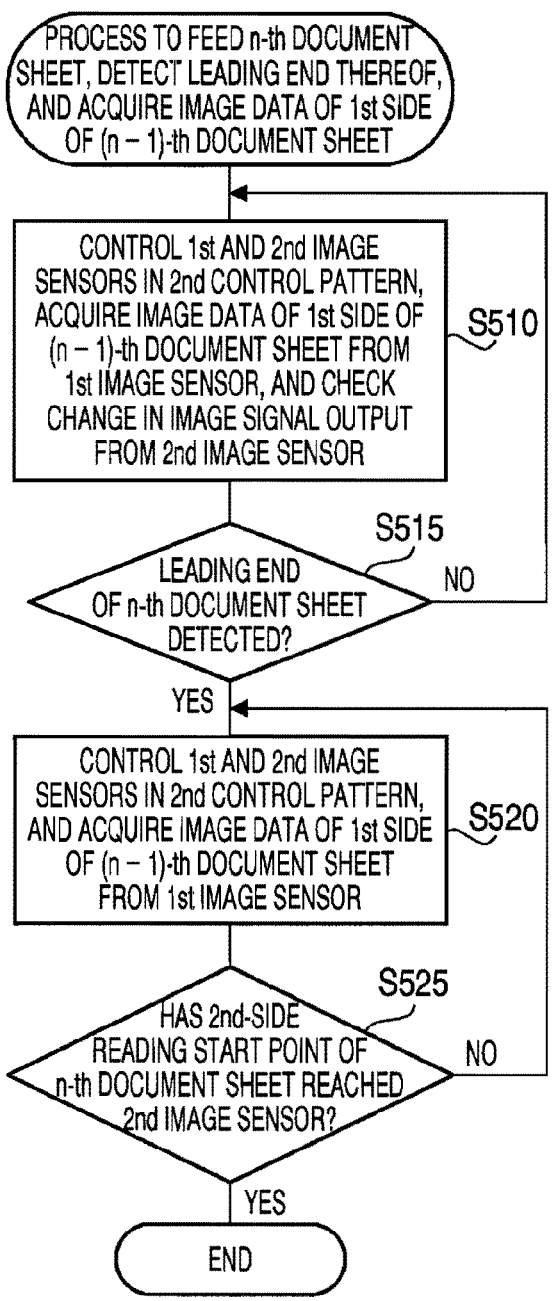

FIG.11A

| READING POSITION | | 1st LINE | 2nd LINE | 3rd LINE | 4th LINE | 5th LINE | 6th LINE | 7th LINE | 8th LINE | ... |
|---|---|---|---|---|---|---|---|---|---|---|
| 2nd IMAGE SENSOR | LIGHT RECEIVING PORTION | DOCUMENT DETECTION | DOCUMENT DETECTION | DOCUMENT DETECTION | DOCUMENT DETECTION | DOCUMENT DETECTION | DOCUMENT DETECTION | DOCUMENT DETECTION | DOCUMENT DETECTION | ... |
| 2nd IMAGE SENSOR | LIGHT EMITTING PORTION | | | | | OFF | | | | ... |
| 1st IMAGE SENSOR | LIGHT RECEIVING PORTION | | | | | — | | | | ... |
| 1st IMAGE SENSOR | LIGHT EMITTING PORTION | | | | | EMIT GREEN LIGHT | | | | ... |

FIG.11B

| READING POSITION | | 1st LINE | | | | 2nd LINE | | | | ... |
|---|---|---|---|---|---|---|---|---|---|---|
| | | 1st STAGE | 2nd STAGE | 3rd STAGE | 4th STAGE | 1st STAGE | 2nd STAGE | 3rd STAGE | 4th STAGE | ... |
| 2nd IMAGE SENSOR | LIGHT RECEIVING PORTION | IMAGE READING | IMAGE READING | IMAGE READING | DOCUMENT DETECTION | IMAGE READING | IMAGE READING | IMAGE READING | DOCUMENT DETECTION | ... |
| 2nd IMAGE SENSOR | LIGHT EMITTING PORTION | EMIT RED LIGHT | EMIT GREEN LIGHT | EMIT BLUE LIGHT | OFF | EMIT RED LIGHT | EMIT GREEN LIGHT | EMIT BLUE LIGHT | OFF | ... |
| 1st IMAGE SENSOR | LIGHT RECEIVING PORTION | IMAGE READING | DOCUMENT DETECTION | IMAGE READING | IMAGE READING | IMAGE READING | DOCUMENT DETECTION | IMAGE READING | IMAGE READING | ... |
| 1st IMAGE SENSOR | LIGHT EMITTING PORTION | EMIT BLUE LIGHT | OFF | EMIT RED LIGHT | EMIT GREEN LIGHT | EMIT BLUE LIGHT | OFF | EMIT RED LIGHT | EMIT GREEN LIGHT | ... |

IMAGE READER DETECTING LEADING OR TRAILING END DOCUMENT SHEET IN RESPONSE TO CHANGE IN LIGHT RECEIVING STATE

CROSS-REFERENCE TO RELATED APPLICATION

This application claims priority under 35 U.S.C. §119 from Japanese Patent Application No. 2010-042578 filed on Feb. 26, 2010. The entire subject matter of the application is incorporated herein by reference.

BACKGROUND

1. Technical Field

The following description relates to one or more image readers.

2. Related Art

So far, an image reader has been proposed, which is configured to read images on both sides of a document sheet with two image sensors. In the image reader, after a document detecting sensor detects a leading end of the document sheet, each of the two image sensors separately begins to capture image data of a corresponding one of the sides of the document sheet after a lapse of a predetermined time for the corresponding one of the sides. Further, after the document detecting sensor detects a trailing end of the document sheet, each the two image sensors separately stops capturing the image data at a time when a predetermined time for the corresponding one of the sides has elapsed.

SUMMARY

However, the known image reader needs to have the document detecting sensor to detect the leading end and/or the trailing end of the document sheet, separately from the two image sensors. Thus, it leads to increase in a manufacturing cost of the image reader.

Aspects of the present invention are advantageous to provide one or more improved techniques for an image reader, which techniques make it possible to detect a leading end and a trailing end of a document sheet without any special sensor provided separately from image sensors.

According to aspects of the present invention, an image reader is provided, which includes a first reading unit that includes a first light emitting portion configured to emit light onto a first side of a document sheet, and a first light receiving portion configured to receive the light reflected from the first side of the document sheet, so as to read out an image having a plurality of pixels arranged along a main scanning direction from the first side of the document sheet, a second reading unit that includes a second light emitting portion configured to emit light onto a second side opposite to the first side of the document sheet, and a second light receiving portion configured to receive the light reflected from the second side of the document sheet, so as to read out an image having a plurality of pixels arranged along the main scanning direction from the second side of the document sheet, a feeder configured to feed the document sheet along a feeding path in a sub scanning direction perpendicular to the main scanning direction, a light guide unit that forms an optical path to guide the light emitted by the first light emitting portion to the second light receiving portion, which optical path passes across the feeding path in a detection position such that the document sheet passing through the detection position on the feeding path blocks the light that is guided on the optical path from the first light emitting portion to the second light receiving portion, and a controller configured to determine that one of a leading end and a trailing end of the document sheet passes through the detection position, in response to detecting a change in a light receiving state of the second light receiving portion when the document sheet passes through the detection position in a state where the first light emitting portion is set ON to emit the light and the second light emitting portion is set OFF not to emit the light.

BRIEF DESCRIPTION OF THE ACCOMPANYING DRAWINGS

FIGS. 4A to 4D schematically show positional relationship between a document sheet being conveyed and an optical path extending from a light guide to a second image sensor, respectively, in a state before a leading end of the document sheet reaches a detection position (see FIG. 4A), a state just after the leading end of the document sheet has reached the detection position (see FIG. 4B), a state just after the leading end (or a reading start point) of the document sheet has reached a reading position for the second image sensor (see FIG. 4C), and a state just after a trailing end of the document sheet has passed through the detection position (see FIG. 4D) in the embodiment according to one or more aspects of the present invention.

Figure 5A:
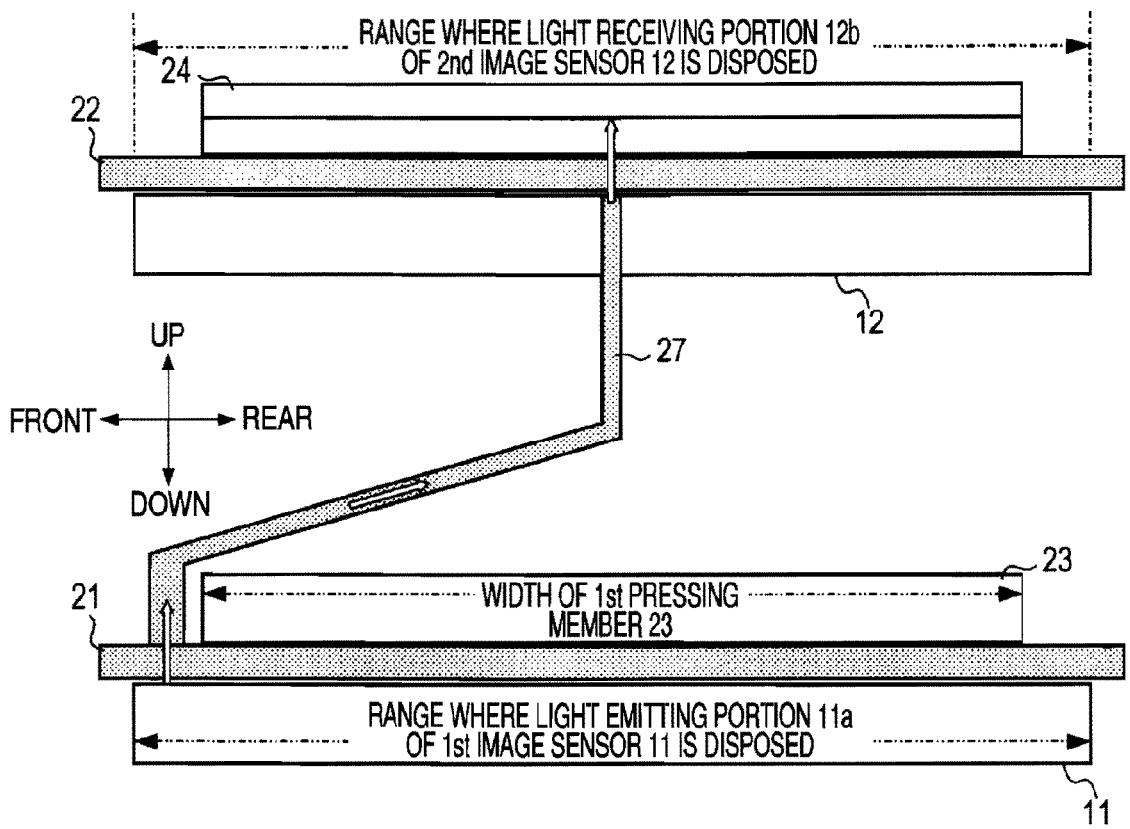

FIG. 5A is an illustration to show a positional relationship among a first image sensor, the second image sensor, and the light guide when viewed from a right side in the embodiment according to one or more aspects of the present invention.

Figure 5B:
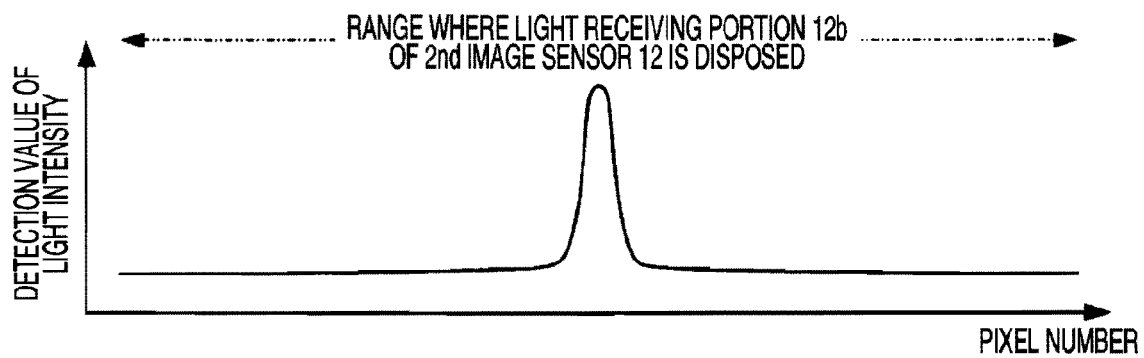

FIG. 5B is a graph showing a light receiving state of the second image sensor which receives light from the light guide in the embodiment according to one or more aspects of the present invention.

Figure 5C:
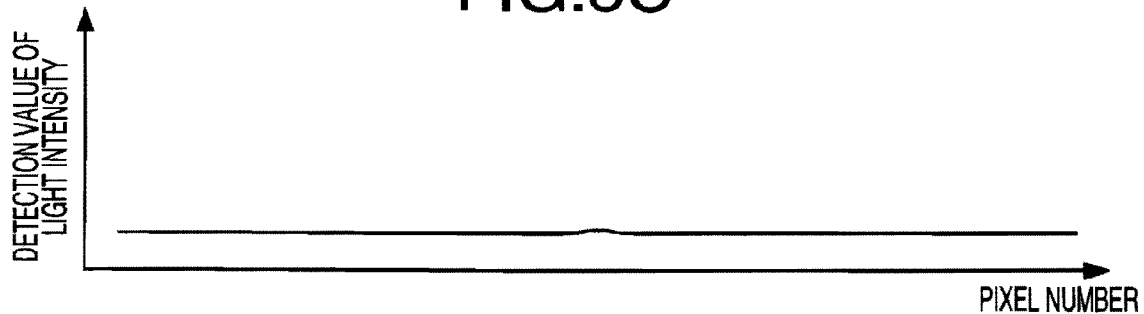

FIG. 5C is a graph showing a light receiving state of the second image sensor which cannot receive light from the light guide in the embodiment according to one or more aspects of the present invention.

Figure 6:
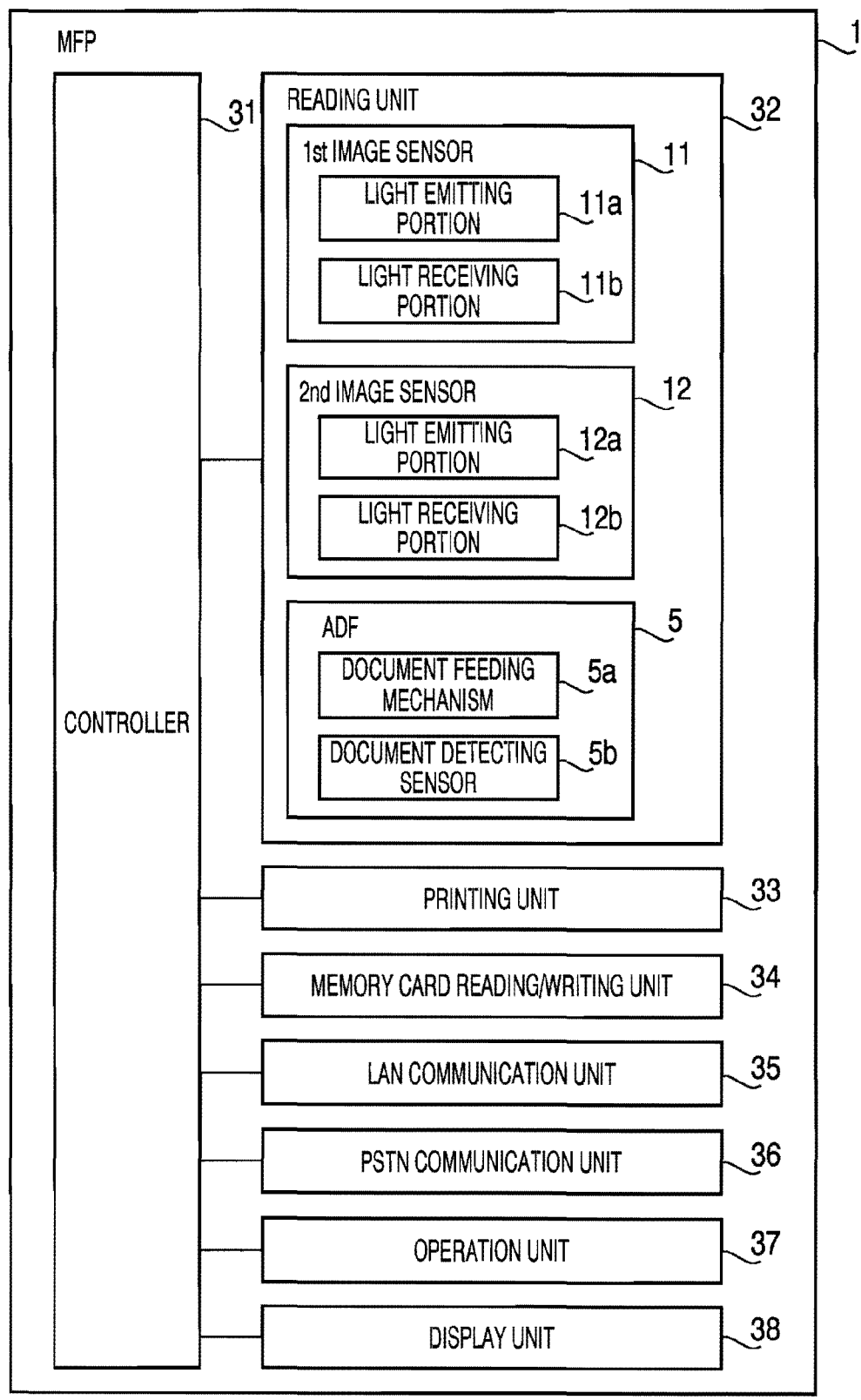

FIG. 6 is a block diagram showing a control system of the MFP in the embodiment according to one or more aspects of the present invention.

Figure 7:
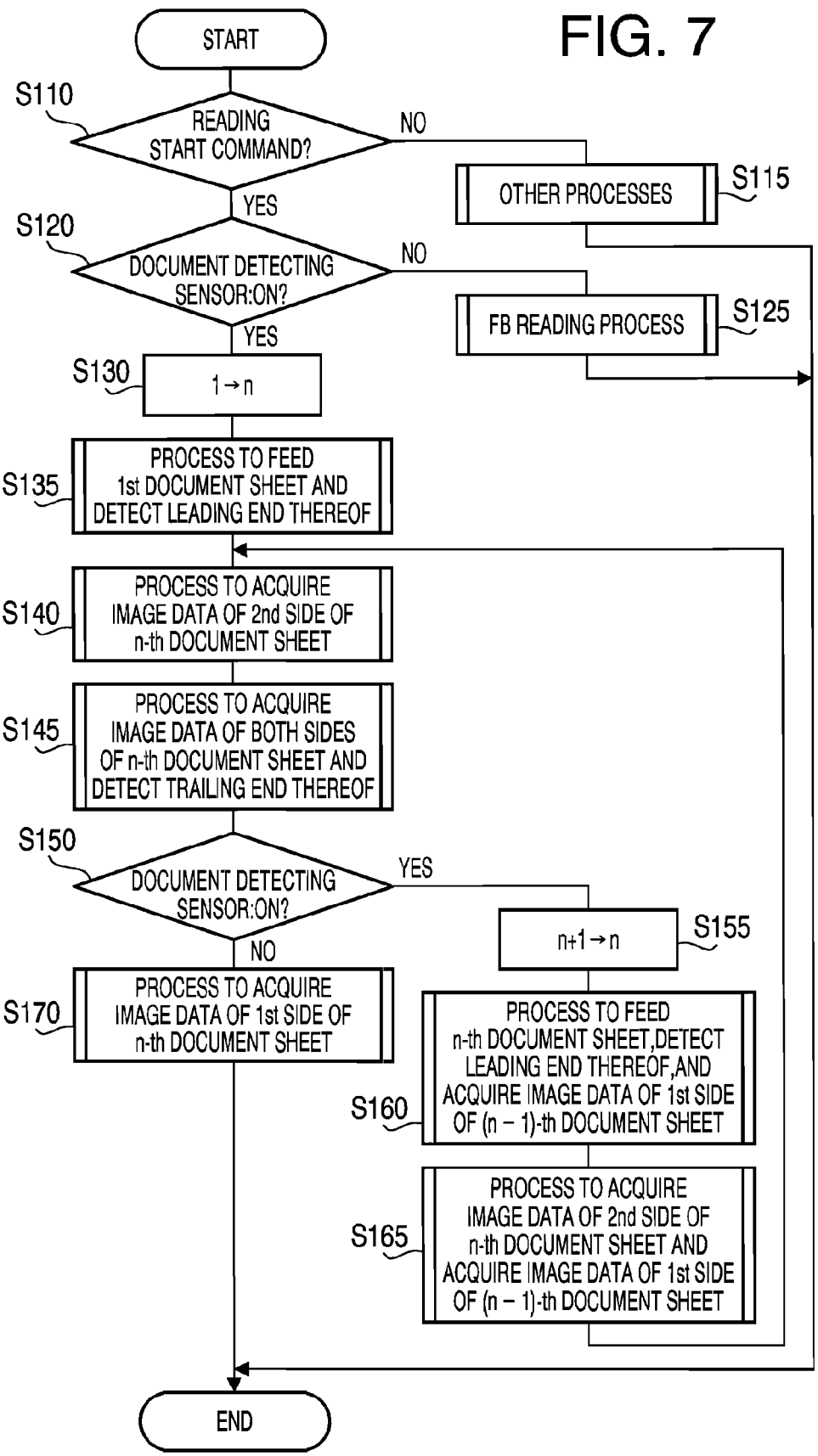

FIG. 7 is a flowchart showing a procedure of a process to be executed by the MFP in the embodiment according to one or more aspects of the present invention.

Figure 8A:
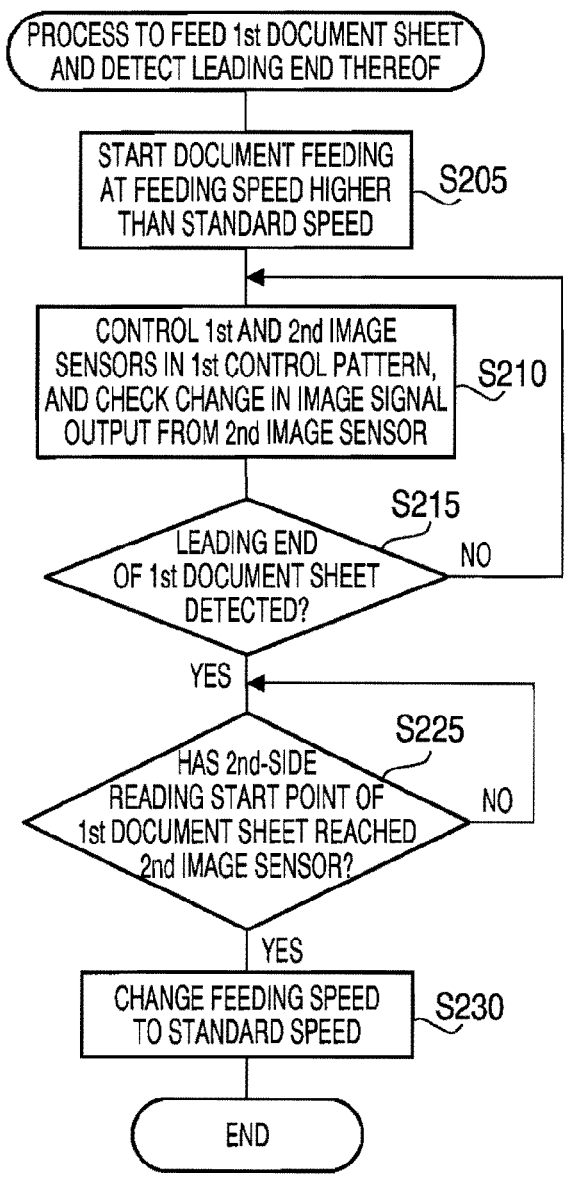

FIG. 8A is a flowchart showing a procedure of a process to feed a first document sheet and detect a leading end thereof in the embodiment according to one or more aspects of the present invention.

Figure 8B:
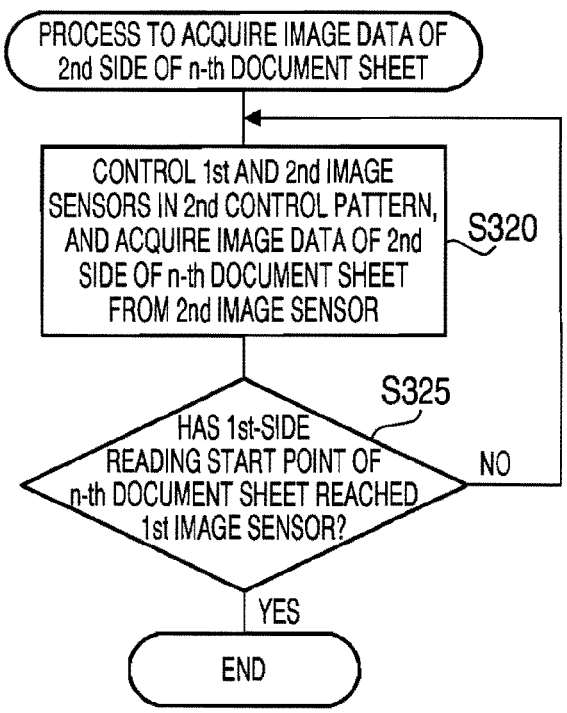

FIG. 8B is a flowchart showing a procedure of a process to acquire image data of a second side of an n-th document sheet in the embodiment according to one or more aspects of the present invention.

FIG. 9A is a flowchart showing a procedure of a process to acquire image data of both sides of the n-th document sheet and detect a trailing end thereof in the embodiment according to one or more aspects of the present invention.

FIG. 9B is a flowchart showing a procedure of a process to feed the n-th document sheet, detect a leading end thereof, and acquire image data of a first side of an (n−1)-th document sheet in the embodiment according to one or more aspects of the present invention.

Figure 10A:
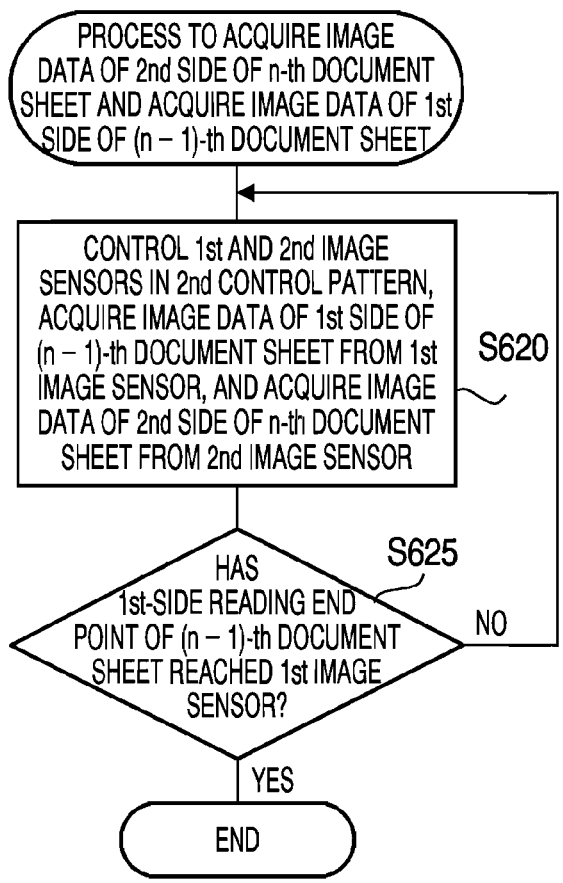

FIG. 10A is a flowchart showing a procedure of a process to acquire image data of the second side of the n-th document sheet and acquire image data of the first side of the (n−1)-th document sheet in the embodiment according to one or more aspects of the present invention.

Figure 10B:
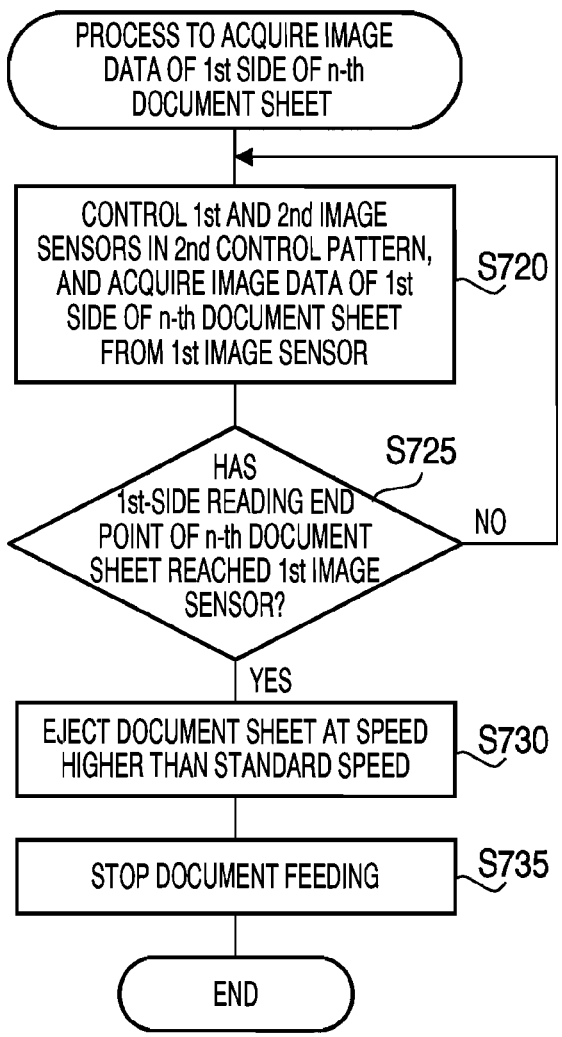

FIG. 10B is a flowchart showing a procedure of a process to acquire image data of the first side of the n-th document sheet in the embodiment according to one or more aspects of the present invention.

FIG. 11A is a table showing a first control pattern in the embodiment according to one or more aspects of the present invention.

FIG. 11B is a table showing a second control pattern in the embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an embodiment according to aspects of the present invention will be described with reference to the accompanying drawings.

[Configuration of MFP]

Figure 1A:
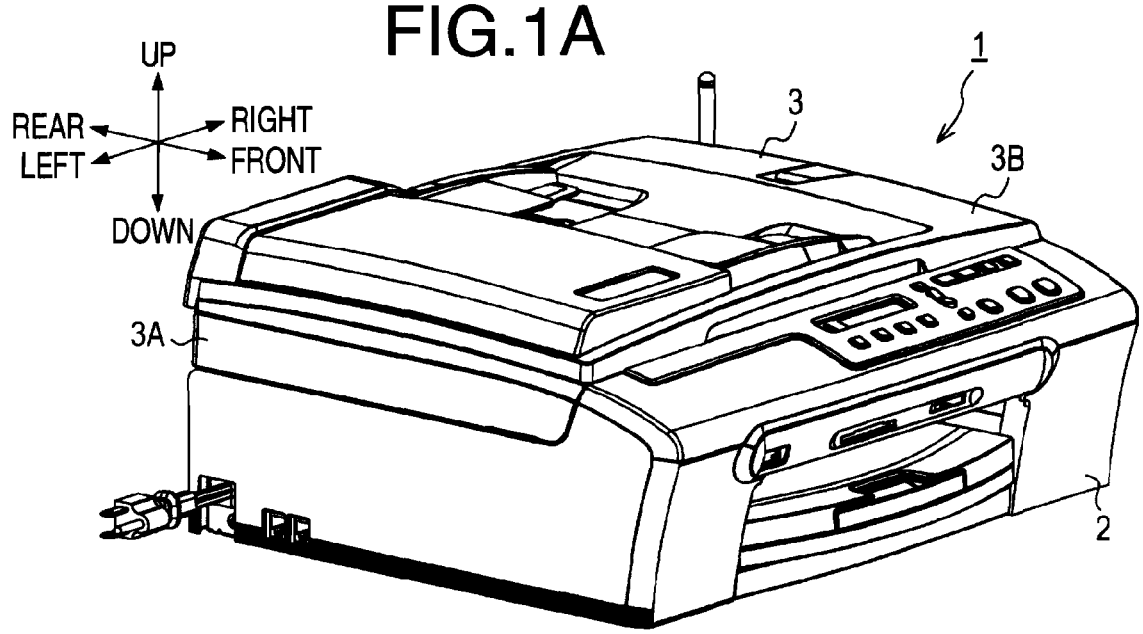
FIG. 1A is a perspective view of a multi-function peripheral (MFP) having an image reader in a state where a flatbed cover is closed in an embodiment according to one or more aspects of the present invention.
Figure 1B:
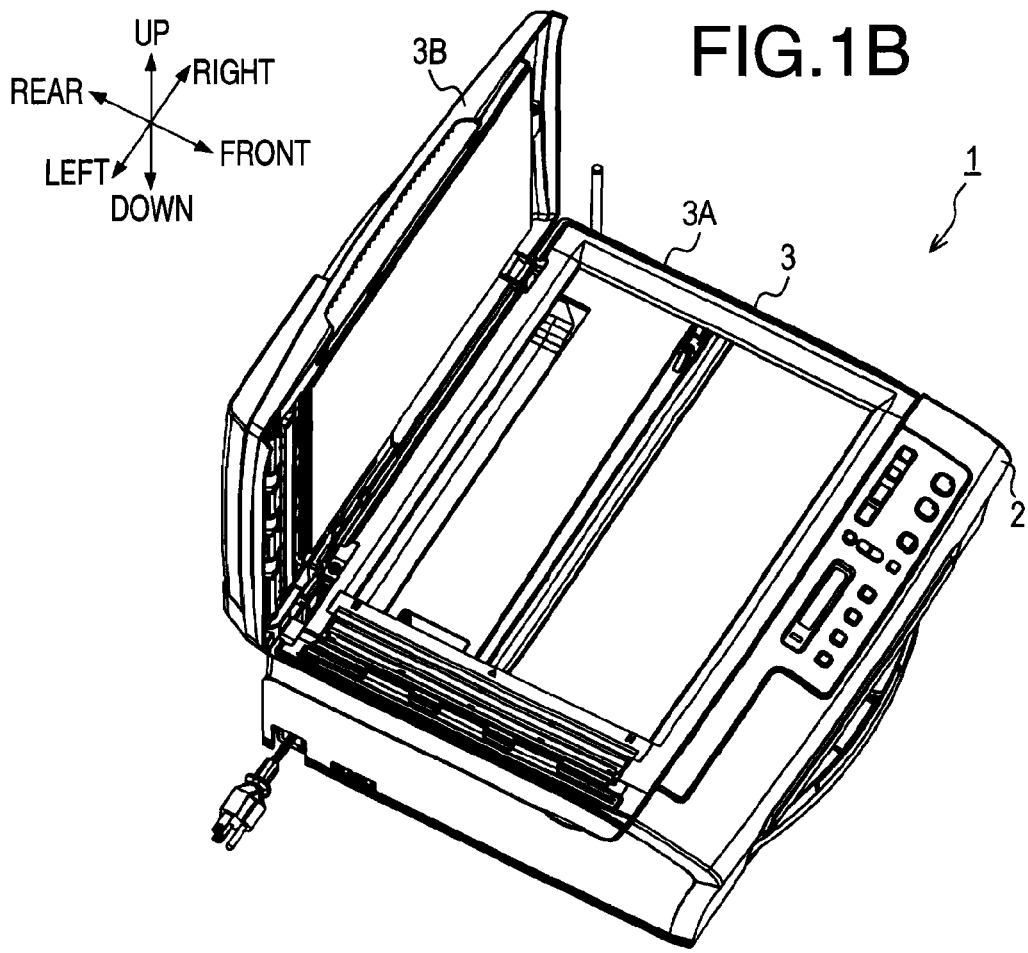
FIG. 1B is a perspective view of the MFP in a state where the flatbed cover is open in the embodiment according to one or more aspects of the present invention.

A multi-function peripheral (MFP) 1 shown in FIGS. 1A and 1B has multiple functions such as a printing function, a copy function, and a facsimile function, as well as a scanning function required for the MFP 1 to serve as an image reader. In the following description, an up-to-down direction, a left-to-right direction, and a front-to-rear direction will be defined based on the directions shown in the relevant drawings, for the sake of easy understanding of relative positional relationship among elements of the MFP 1.

The MFP 1 includes a main unit 2 and a scanning unit 3 provided above the main unit 2. The scanning unit 3 is configured to be open and closed relative to the main unit 2 in response to a front end of the scanning unit 3 being turned up and down around a rear end thereof. When setting the scanning unit 3 into an open state (not shown) from a closed state shown in FIG. 1A by using the aforementioned open/closed mechanism of the scanning unit 3, a user can conduct maintenance on an internal mechanism incorporated in the main unit 2.

The scanning unit 3 includes a document table 3A configured such that a document sheet is placed thereon, and a cover 3B configured to cover an upper side of the document table 3A. The cover 3B is configured to be open and closed relative to the document table 3A when a front end thereof is turned up and down around a rear end thereof. When setting the cover 3B into an open state shown in FIG. 1B from a closed state shown in FIG. 1A by using the aforementioned open/closed mechanism of the cover 3B, the user can place the document sheet on the document table 3A.

Further, the cover 3B is configured to be displaced relative to the document table 3A in the vertical direction. This displacement mechanism is provided to the cover 3B, separately from the aforementioned open/closed mechanism. Thereby, even though a relatively thick document sheet is to be placed on the document table 3A, the document sheet can be set on the document table 3A in a state sandwiched between the document table 3A and the document cover 3B.

[Detailed Configuration of Scanning Unit]

Figure 2:
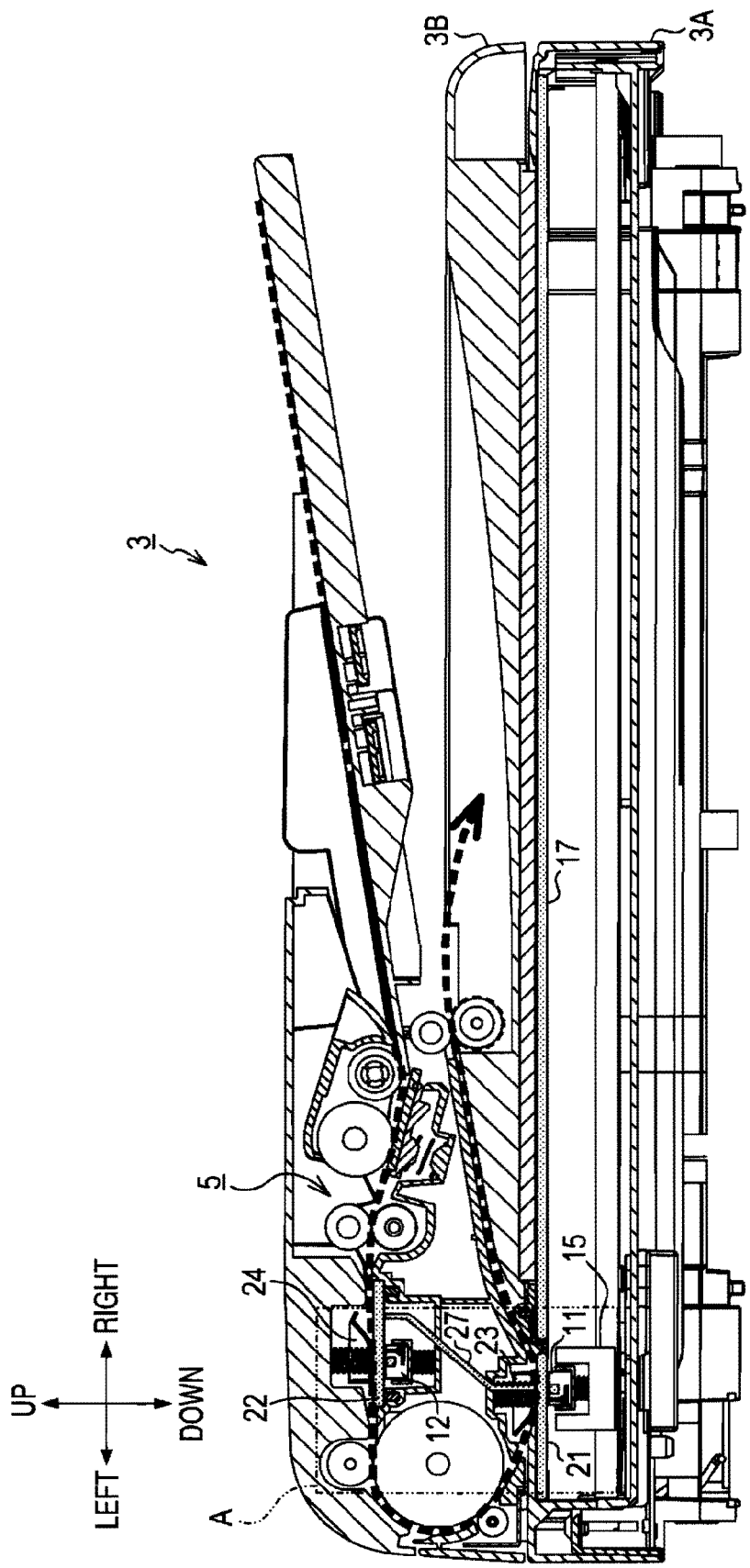
FIG. 2 is a cross-sectional side view showing an internal configuration of a scanning unit in the embodiment according to one or more aspects of the present invention.

A detailed explanation will be provided about the scanning unit 3 with reference to FIG. 2. The scanning unit 3 is configured with an automatic document feeder (ADF) 5 added to a flatbed (FB) scanner. Further, the scanning unit 3 includes a first image sensor 11 and a second image sensor 12. In the embodiment, each of the first and second image sensors 11 and 12 employs a contact image sensor.

The first image sensor 11 is mounted on a carriage 15 provided in the document table 3A and configured to move in the left-to-right direction together with the carriage 15. Further, there is an FB glass 17 provided above the moving path of the first image sensor 11.

When the scanning unit 3 is used as an FB scanner, the document sheet is placed on the FB glass 17. In this case, the first image sensor 11 reads an image on the document sheet by repeatedly capturing image data of a plurality of pixels aligned along a main scanning direction while moving in a sub scanning direction. It is noted that the main scanning direction is defined as the front-to-rear direction of the MFP 1, and the sub scanning direction is defined as the left-to-right direction of the MFP 1.

Additionally, in the scanning unit 3, a first ADF glass 21 is disposed in a position that is above the moving path of the first image sensor 11 and on a left side relative to the FB glass 17. A second ADF glass 22 is disposed above the second image sensor 12. A first pressing member 23 is disposed above the first ADF glass 21. A second pressing member 24 is disposed above the second ADF glass 22.

When the scanning unit 3 is used as an ADF scanner, the first image sensor 11 moves to a position beneath the first pressing member 23 in the left-to-right direction, and stops in the position. The second image sensor 12 is disposed in a position beneath the second pressing member 24 in the left-to-right direction, and fixed in the position so as not to move therefrom in the left-to-right direction.

The document sheet, fed by the ADF 5, is conveyed along a feeding path indicated by a dashed line in FIG. 2 and passes through between the second ADF glass 22 and the second pressing member 24. At that time, the second image sensor 12 reads an image on a second side (a down-facing side at the time when the document sheet passes over the second image sensor 12) of the document sheet, by repeatedly capturing image data of a plurality of pixels aligned in the main scanning direction (i.e., the front-to-rear direction of the MFP 1) from the document sheet that is moving in the sub scanning direction (i.e., a feeding direction).

The document sheet, fed by the ADF 5, passes through between the first ADF glass 21 and the first pressing member 23 after passing through between the second ADF glass 22 and the second pressing member 24. At that time, the first image sensor 11 reads an image on a first side (a down-facing side at the time when the document sheet passes over the first image sensor 11) of the document sheet, by repeatedly capturing image data of the plurality of pixels aligned in the main scanning direction (i.e., the front-to-rear direction of the MFP 1) from the document sheet that is moving in the sub scanning direction (i.e., the feeding direction).

Namely, to read the images from both the first and second sides of the document sheet, the second image sensor 12 is controlled to start image reading earlier than the first image sensor 11. Thereafter, at the time when the document sheet reaches a position to face the first image sensor 11, the first image sensor 11 is controlled to start image reading. It is noted that the user can arbitrarily configure a setting to make a choice between double-side reading with both the first and second image sensors 11 and 12 and single-side reading with one of the first and second image sensors 11 and 12.

[Detection of Leading and Trailing Ends of Document]

Subsequently, an explanation will be provided about a configuration to detect the leading end and the trailing end of the document sheet, with reference to FIGS. 3 to 5.

In the scanning unit 3, a light guide 27 is disposed in an area extending from an upper side of the first ADF glass 21 to a lower side of the second ADF glass 22. As shown in an enlarged manner in FIG. 3, the light guide 27 is configured to guide light emitted by a light emitting portion 11a of the first image sensor 11 to a light receiving portion 12b of the second image sensor 12.

Specifically, the first image sensor 11 is configured to emit, from the light emitting portion 11a, light to be incident onto the document sheet and receive light reflected from the document sheet with a light receiving portion 11b. Further, the second image sensor 12 is configured to emit, from a light emitting portion 12a, light to be incident onto the document sheet and receive light reflected from the document sheet with the light receiving portion 12b.

Figure 3:
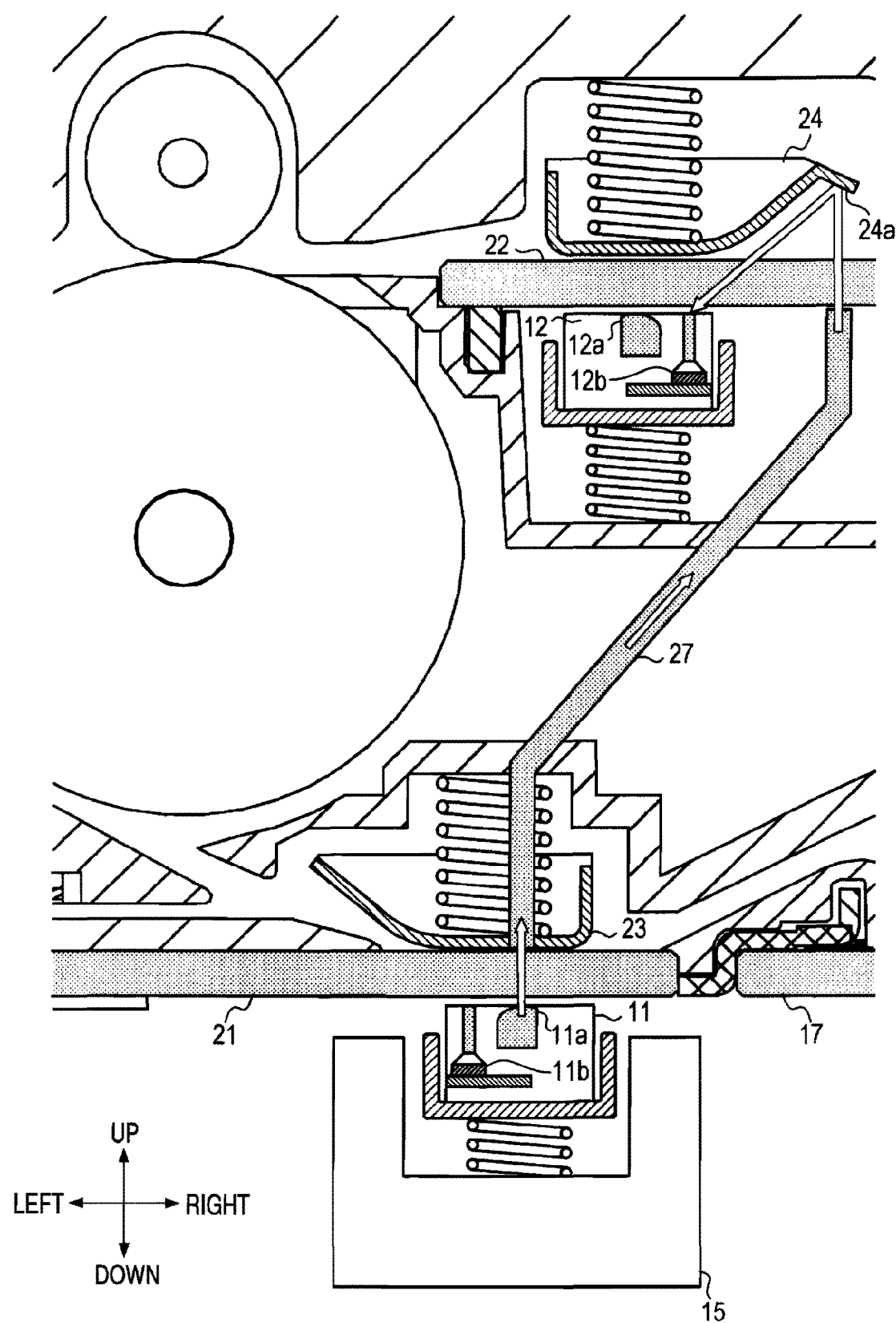
FIG. 3 is a cross-sectional side view showing a section A indicated in FIG. 2 in an enlarged manner in the embodiment according to one or more aspects of the present invention.

Further, when the image sensor 11 reads out the image from the document sheet being fed by the ADF 5, the image sensor 11 moves to an ADF reading position as shown in FIG. 3 along the sub scanning direction (the left-to-right direction in FIG. 3). The light guide 27 is disposed in a position where when the image sensor 11 emits light from the light emitting portion 11a in the ADF reading position, the emitted light is incident onto a lower end of the light guide 27.

The light, emitted by the light emitting portion 11a of the first image sensor 11 located in the ADF reading position, is transmitted through the light guide 27 and reaches an upper end of the light guide 27, as indicated by an outline arrow in FIG. 3. Then, the light is emitted from the upper end of the light guide 27 toward a reflection surface 24a that is disposed at a right side of the second pressing member 24. Thereafter, the light, reflected from the reflection surface 24a, is received by the light receiving portion 12b of the second image sensor 12.

In this state, when conveyed by the ADF 5, a document sheet D passes through between the second ADF glass 22 and the second pressing member 24, as illustrated in FIGS. 4A to 4D. At the time when the leading end of the document sheet D is in a position upstream relative to the upper end of the light guide 27 on the feeding path (see FIG. 4A), an optical path extending from the light guide 27 to the light receiving portion 12b is not blocked by the document sheet D.

Meanwhile, when the leading end of the document sheet D passes through a position (a detection position) on the optical path extending from the light guide 27 to the light receiving portion 12b (see FIG. 4B), the optical path is blocked by the document sheet D such that the light emitted from the light guide 27 does not reach the light receiving portion 12b.

After that, when the document sheet D is fed by a predetermined distance (see FIG. 4C), the leading end (or a reading start point) of the document sheet D reaches a reading position just above the second image sensor 12. Accordingly, at and after the above time, the second image sensor 12 can read out the image from the document sheet D, as the light emitted by the light emitting portion 12a is reflected from the document sheet D and received by the light receiving portion 12b.

After that, when the document sheet D is further conveyed, the trailing end of the document sheet finally passes through the position (the detection position) on the optical path extending from the light guide 27 to the light receiving portion 12b. Consequently, in such a state, the optical path extending from the light guide 27 to the light receiving portion 12b is not blocked by the document sheet D.

Accordingly, based on a change in the light receiving state of the light receiving portion 12b as described above, it is possible to detect whether the leading/trailing end of the document sheet D passes through the position (the detection position) on the optical path extending from the light guide 27 to the light receiving portion 12b. A specific explanation will be provided later about control for detecting the leading/trailing end of the document sheet D.

As depicted in FIG. 5A, the lower end of the light guide 27 faces the first image sensor 11 in a position outside a width of the first pressing member 23 in the front-to-rear direction (at a front side relative to the first pressing member 23 in the front-to-rear direction). Therefore, even though a document sheet is conveyed between the first ADF glass 21 and the first pressing member 23, the light emitted by the light emitting portion 11a is incident onto the lower end of the light guide 27.

Meanwhile, the upper end of the light guide 27 faces the second pressing member 24 (the reflection surface 24a) in a narrow range located in a center in a width direction (the front-to-rear direction in FIG. 5A) of the second pressing member 24. Therefore, when the light receiving portion 12b performs scanning in the main scanning direction in a state where the light emitting portion 11a emits light and the light emitting portion 12a does not emit light, the light receiving portion 12b can receive the light only in a partial range around the center thereof in the main scanning direction.

Nonetheless, the light receiving portion 12b can receive the light only when there is not a document sheet between the second ADF glass 22 and the second pressing member 24. When there is a document sheet between the second ADF glass 22 and the second pressing member 24, the optical path, extending from the upper end of the light guide 27 to the light receiving portion 12b via the reflection surface 24a, is blocked by the document sheet.

Hence, when there is not a document sheet between the second ADF glass 22 and the second pressing member 24, the second image sensor 12 outputs an image signal having a peak around a center as shown in FIG. 5B. Meanwhile, when there is a document sheet between the second ADF glass 22 and the second pressing member 24, the second image sensor 12 outputs an image signal with no peak around a center as shown in FIG. 5C.

Figure 4A:
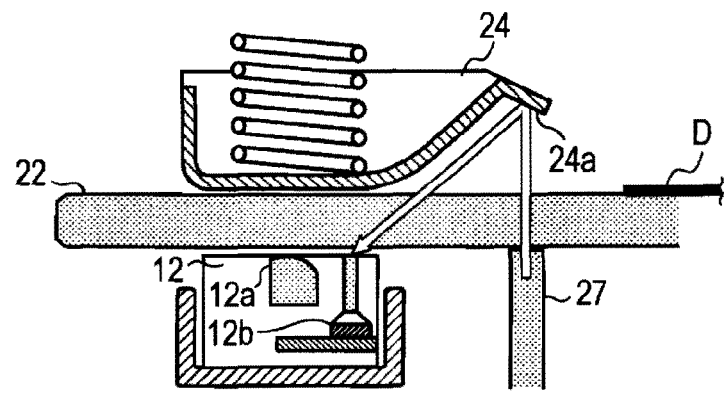
Figure 4B:
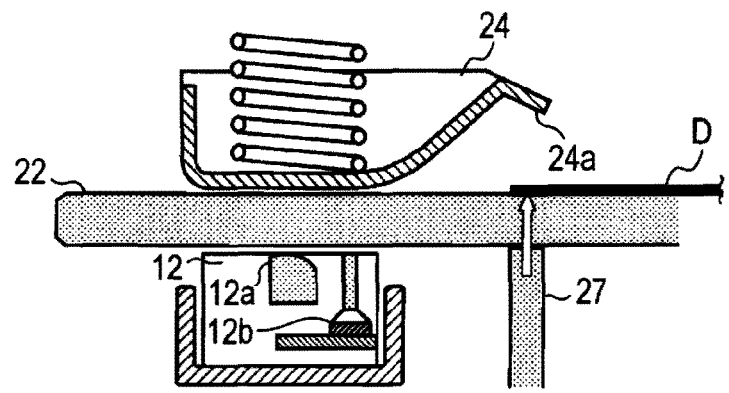
Figure 4C:
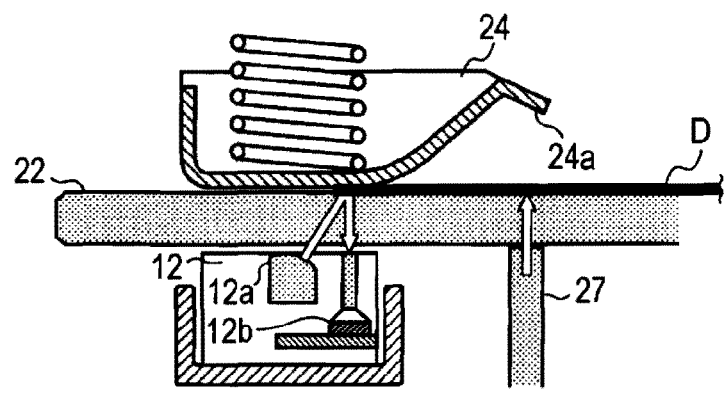
Figure 4D:
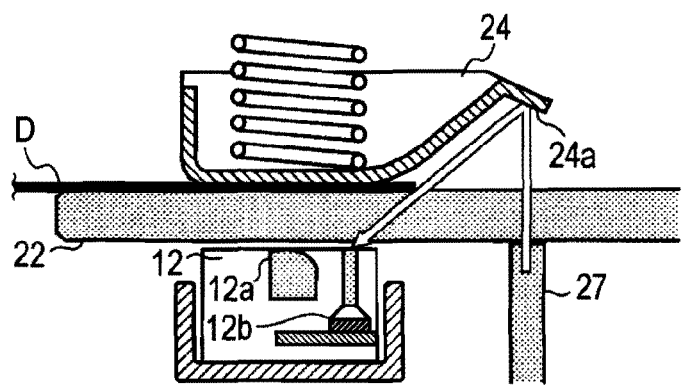

In other words, when the document sheet D is conveyed from a position as shown in FIG. 4A to a position as shown in FIG. 4B, the image signal output from the second image sensor 12 varies from a state as shown in FIG. 5B to a state as shown in FIG. 5C. Thereafter, the document sheet D is fed to a position as shown in FIG. 4D, the image signal output from the second image sensor 12 varies from the state as shown in FIG. 5C back to the state as shown in FIG. 5B.

Accordingly, based on the change in the image signal output from the second image sensor 12 from the state as shown in FIG. 5B to the state as shown in FIG. 5C, it is possible to detect a state where the leading end of the document sheet reaches the aforementioned position to block the optical path.

Additionally, based on the change in the image signal output from the second image sensor 12 from the state as shown in FIG. 5C to the state as shown in FIG. 5B, it is possible to detect a state where the trailing end of the document sheet passes through the aforementioned position to block the optical path.

[Control System of MFP]

Subsequently, a control system of the MFP 1 will be described with reference to FIG. 6. The MFP 1 includes a controller 31, a reading unit 32, a printing unit 33, a memory card reading/writing unit 34, a LAN communication unit 35, a PSTN communication unit 36, an operation unit 37, and a display unit 38.

The controller 31 includes known elements such as a CPU, a ROM, and a RAM. The CPU of the controller 31 takes control of each elements included in the MFP 1 when running control programs stored on the ROM or the RAM.

The reading unit 32 is configured to read an image on a document sheet and provided with the already-described first image sensor 11, second image sensor 12, and ADF 5. The ADF 5 includes a document feeding mechanism 5a configured to feed document sheets along the feeding path on a sheet-by-sheet basis, and a document detecting sensor 5b configured to detect whether there is a document set on the ADF 5.

The printing unit 33 is configured with a printing mechanism employing an electrophotographic technique or an inkjet technique. In the copy function of the MFP 1, the printing unit 33 is used to print an image read by the reading unit 32. Further, in the facsimile function of the MFP 1, the printing unit 33 is used to print an image received via facsimile communication.

The memory card reading/writing unit 34 is configured to, when a removable medium such as a memory card and a USB memory is attached thereto, read data from the removable medium and/or write data onto the removable medium.

The LAN communication unit 35 is configured with a communication interface device complying with a wireless LAN and a communication interface device complying with a wired LAN. Through the LAN communication unit 35, the MFP 1 can perform data communication with a device via a LAN.

The PSTN communication unit 36 is configured with various devices, such as a facsimile modem and an audio CODEC, which are necessary for connection with a public switched telephone networks (PSTN). Through the PSTN communication unit 36, the MFP 1 can communicate with a device (e.g., a facsimile machine) via the PSTN. For instance, when the user uses the facsimile function of the MFP 1, transmission/reception of data is carried out via the PSTN communication unit 36.

The operation unit 37 is an input device which the user operates when providing various commands to the MFP 1, and includes a touch panel, various buttons, and switches. The display unit 38 is an output device configured to notify the user about an operational status of the MFP 1, and includes a liquid crystal display (LCD) device.

[Image Reading Process]

Subsequently, an explanation will be provided about an image reading process that the MFP 1 performs, with reference to FIGS. 7, 8A, 8B, 9A, 9B, 10A and 10B. A process shown in FIG. 7 is executed by the controller 31 in response to some sort of event occurring in the MFP 1.

When the process shown in FIG. 7 is launched, the controller 31 firstly determines whether a reading start command has been issued (S110). The determination as to whether the reading start command has been issued can be made, for instance, based on whether a scan button provided to the operation unit 37 has been pressed. However, in this respect, such a reading start command may be received from an external device (e.g., a PC) via the LAN communication unit 35. Thus, a method for determining whether the reading start command has been issued is not limited to a specific one.

When determining that a reading start command has not been issued (S110: No), the controllers 31 performs one or more processes other than the image reading process (S115). After that, the controller 31 terminates the process shown in FIG. 7. It is noted that since the one or more processes other than the image reading process are not directly related to any major aspects of the present invention, a further explanation about them will be omitted in the following description. Meanwhile, when determining that a reading start command has been issued (S110: Yes), the controllers 31 determines whether the document detecting sensor 5b is ON (S120).

When determining that the document detecting sensor 5b is OFF (S120: No), the controller 31 determines that there is no document sheet set on the ADF 5, and performs an FB reading process (S125). Thereafter, the controller 31 terminates the process shown in FIG. 7. It is noted that since the FB reading process, which is for reading out an image from a document sheet placed on the document table 3A, is not directly related to any major aspects of the present invention, a further explanation about it will be omitted in the following description.

Meanwhile, when determining that the document detecting sensor 5b is ON (S120: Yes), the controller 31 determines that there is a document sheet set on the ADF 5, and resets a counter value "n" to "1" (S130). The, the controller 31 performs a process to feed a first document sheet and detect a leading end thereof (S135).

A detailed procedure of S135 is shown in FIG. 8A. When the process of S135 is started, the controller 31 firstly begins document feeding at a feeding speed higher than a standard speed (S205). The standard speed is a feeding speed applied when the MFP 1 reads a color image from a document sheet with the first image sensor 11 or the second image sensor 12 and acquires image data of the read color image.

The standard speed varies depending on a reading resolution. Namely, a lower standard speed is employed for a higher reading resolution. In S205, the controller 31 starts document feeding at a feeding speed higher than such a standard speed. Thereby, it is possible to convey the document sheet to the reading start position more quickly than a case where document feeding is started at the standard speed. It is noted that a detailed explanation will be provided later about a difference between the "standard speed" and the "feeding speed higher than the standard speed".

Next, the controller 31 controls operations of the first image sensor 11 and the second image sensor 12 in a first control pattern and checks a change in the image signal output from the second image sensor 12 (S210). When controlled in the first control pattern, the first image sensor 11 and the second image sensor 12 work in respective operational states as shown in FIG. 11A.

Specifically, the controller 31 controls the light emitting portion 11a of the first image sensor 11 to emit green-colored light and turns OFF the light emitting portion 12a of the second image sensor 12. In this state, the controller 31 controls the light receiving portion 12b of the second image sensor 12 to receive light. Thereby, the second image sensor 12 outputs an image signal.

Further, the controller 31 feeds the document sheet at such a speed as to feed the document sheet in the sub scanning direction by one line every single light receiving operation.

Namely, the "feeding speed higher than the standard speed" referred to in S205 denotes "such a speed as to feed a document sheet by one line in the sub scanning direction every single light receiving operation."

As will be described in detail later, in the embodiment, the "standard speed" referred to in S205 denotes "such a speed as to feed a document sheet by one line in the sub scanning direction every four light receiving operations. Thereby, it is possible to understand that the "feeding speed higher than the standard speed" referred to in S205 is adequately higher than the "standard speed."

Further, "such a speed as to feed a document sheet by one line in the sub scanning direction" is lower as the reading resolution, which is arbitrarily settable by the user, is higher. However, in S210, as far as it is possible to detect the leading end of the document sheet without problems, an excessively high reading resolution is not necessary for detecting the leading end of the document sheet. Therefore, in S210, the reading resolution may be changed to be lower than a user-set resolution. When the reading resolution is changed to be lower than a user-set resolution, the aforementioned "feeding speed higher than the standard speed" becomes further higher than the "standard speed."

When a leading end of a first document sheet does not reach (the detection position on) the optical path extending from the light guide 27 to the light receiving portion 12b, the image signal output from the second image sensor 12 has a waveform as shown in FIG. 5B. Meanwhile, when the leading end of the first document sheet reaches (the detection position on) the optical path extending from the light guide 27 to the light receiving portion 12b, the image signal output from the second image sensor 12 has a waveform as shown in FIG. 5C. Therefore, in S210, the controller 31 checks whether there is a change between the above image signals (S210).

Based on a check result as to whether there is a change in the image signal output from the second image sensor 12, the controller 31 determines whether the controller 31 has detected the leading end of the first document sheet (S215). When determining that the controller 31 has not yet detected the leading end of the first document sheet (S215: No), the controller 31 goes back to S210, and repeatedly executes the steps S210 to S215. Thus, the controller 31 continues to execute S210 every one-line document feeding (each time the controller 31 feeds the first document sheet by one line), until the controller 31 detects the leading end of the first document sheet.

Meanwhile, when determining that the controller 31 has detected the leading end of the first document sheet (S215: Yes), the controller 31 determines whether a second-side reading start point of the first document sheet has reached the reading position for the second image sensor 12 (S225).

Specifically, the second-side reading start point is arbitrarily settable, and for instance, the leading end of the document sheet may be set as the second-side reading start point. Alternatively, a position that is shifted from the leading end to the trailing end by a predetermined amount of margin may be set as the second-side reading start point.

In S225, the controller 31 determines whether the second-side reading start point of the first document sheet has reached the reading position for the second image sensor 12, with a reference time as a time when the controller 31 detects the leading end of the first document sheet passing through the detection position.

A distance of a section on the feeding path between the detection position to detect the leading end of the document sheet passing therethrough and the reading position for the second image sensor 12 is a known value. In addition, a feeding speed at which the document sheet is conveyed within the above section is a known value. Further, in any of a case where the leading end of the document sheet is set as the second-side reading start point and a case where the position shifted from the leading end to the trailing end by the predetermined amount of margin is set as the second-side reading start point, a distance between the leading end of the document sheet and the second-side reading start point is a known value.

Accordingly, by using the known values, it is possible to calculate a period of time between a time to detect the leading end of the document sheet passing through the detection position and a time when the second-side reading start point of the document sheet, being conveyed at a predetermined feeding speed, reaches the reading position for the second image sensor 12. Therefore, in S225, it is possible to determine whether the second-side reading start point of the first document sheet has reached the reading position for the second image sensor 12, based on whether the above calculated period of time has elapsed after detection of the leading end of the document sheet passing through the detection position.

Moreover, when a distance by which the document sheet is fed in response to the controller 31 providing a unit of driving signals to the document feeding mechanism 5a is a known value, it is possible to calculate how many units of driving signals the controller 31 needs to provide after detection of the leading end of the document sheet passing through the detection position so as to make the second-side reading start position reach the reading position for the second image sensor 12.

Thus, in this case, in S225, it is possible to determine whether the second-side reading start point of the first document sheet has reached the reading position for the second image sensor 12, based on whether the controller 31 provides a predetermined number of units of driving signals to the document feeding mechanism 5a after detection of the leading end of the document sheet passing through the detection position.

Based on the aforementioned determinations, when determining that the second-side reading start point of the first document sheet has not reached the reading position for the second image sensor 12 (S225: No), the controller 31 goes back to S225. Thereby, the controller 31 continues to feed the document sheet at a feeding speed higher than the standard speed until the second-side reading start point of the document sheet reaches the reading position for the second image sensor 12. Then, when determining that the second-side reading start point of the first document sheet has reached the reading position for the second image sensor 12 (S225: Yes), the controller 31 changes the document feeding speed to the standard speed (S230).

After completing execution of S230 (which corresponds to completing execution of S135 in FIG. 7), subsequently, the controller 31 performs an n-th document second-side image data acquiring process to acquire image data of a second side of an n-th document sheet (S140). It is noted that in first execution of S140, the counter value "n" is still "1" as set in S130. In this case, the controller 31 performs a first document second-side image data acquiring process to acquire image data of the second side of the first document sheet in S140.

FIG. 8B shows a specific procedure of the n-th document second-side image data acquiring process that is executed in S140 to acquire image data of the second side of an n-th document sheet. After launching the n-th document second-side image data acquiring process, firstly, the controller 31 controls the operations of the first and second image sensors 11 and 12 in a second control pattern, and acquires image data of the second side of the n-th document sheet from the second image sensor 12 (S320).

When controlled in the second control pattern, the first image sensor 11 and the second image sensor 12 work in respective operational states as shown in FIG. 11B. Specifically, at a first stage, the controller 31 controls the light emitting portion 11a of the first image sensor 11 to emit blue-colored light and turns ON the light emitting portion 12a of the second image sensor 12 to emit red-colored light. In this state, the controller 31 controls the light receiving portion 11b of the first image sensor 11 and the light receiving portion 12b of the second image sensor 12 to receive light. Thereby, each of the first and second image sensors 11 and 12 outputs an image signal.

Further, at a second stage, the controller 31 turns OFF the light emitting portion 11a of the first image sensor 11 and controls the light emitting portion 12a of the second image sensor 12 to emit green-colored light. In this state, the controller 31 controls the light receiving portion 11b of the first image sensor 11 and the light receiving portion 12b of the second image sensor 12 to receive light. Thereby, each of the first and second image sensors 11 and 12 outputs an image signal.

In the same manner, at a third stage and a fourth stage, the controller 31 takes ON/OFF control for the first and second image sensors 11 and 12 as shown in FIG. 11B, such that each of the first and second image sensors 11 and 12 outputs an image signal.

Then, the controller 31 performs document feeding at such a feeding speed as to feed the document sheet by one line in the sub scanning direction every four light receiving operations (i.e., every execution of the aforementioned four stages of light receiving operations). In the embodiment, such a feeding speed is the "standard speed" referred to in S205.

Each image signal output from the second image sensor 12 at the aforementioned first to third stages is a signal corresponding to an image read out of the second side of the n-th document sheet. Therefore, the controller 31 acquires the image signals output at the first to third stages and stores the acquired image signals as image data into an output buffer. The image signals output at the fourth stage are not used in S320.

The image data stored in the output buffer is finally transferred to a different output destination, and for instance, printed by the printing unit 33 or saved by the memory card reading/writing unit 34. It is noted that various kinds of data processing in the different output destination are not directly related to any major aspects of the present invention, a further explanation about them will be omitted in the following description.

After execution of S320, the controller 31 determines whether a first-side reading start point of the n-th document sheet has reached the reading position for the first image sensor 11 (S325). The determination in S325 may be made in the same manner as the determination in S225.

A distance of a section on the feeding path between the detection position to detect the leading end of the document sheet passing therethrough and the reading position for the first image sensor 11 is longer than the distance between the detection position and the reading position. Accordingly, the determination in each of S225 and S325 is made in consideration of the difference between the two distances.

When determining that the first-side reading start point of the n-th document sheet has not reached the reading position for the first image sensor 11 (S325: No), the controller 31 goes back to S325. Thereby, the controller 31 continues to execute S320 every one-line document feeding (each time the controller 31 feeds the n-th document sheet by one line) until the first-side reading start point of the n-th document sheet reaches the reading position for the first image sensor 11.

Then, when determining that the first-side reading start point of the n-th document sheet has reached the reading position for the first image sensor 11 (S325: Yes), the controller 31 completes execution of S140 and then performs a process to acquire image data of both sides of the n-th document sheet and detect a trailing end of the n-th document sheet (S145).

FIG. 9A shows a specific procedure of the process to be executed in S145. After launching the process, initially, the controller 31 controls the operations of the first and second image sensors 11 and 12 in the second control pattern, to acquire image data of the first side of the document sheet from the first image sensor 11, acquire image data of the second side of the document sheet from the second image sensor 12, and check a change in the image signal output from the second image sensor 12 (S410).

As described above, when controlled in the second control pattern, the first image sensor 11 and the second image sensor 12 work in their respective operational states as shown in FIG. 11B. At this time, each image signal output from the first image sensor 11 at the first, third, and fourth stages is a signal corresponding to an image read out of the first side of the n-th document sheet. Therefore, the controller 31 acquires the image signals output at the first, third, and fourth stages and stores the acquired image signals as image data into the output buffer.

Meanwhile, each image signal output from the second image sensor 12 at the first to third stages is a signal corresponding to the image read out of the second side of the n-th document sheet. Accordingly, the controller 31 acquires the image signals output at the first to third stages and stores the acquired image signals as image data into the output buffer.

In addition to the process to acquire the image data of each side of the n-th document sheet, in S410, the controller 31 checks a change in the image signal output from the second image sensor 12 at the fourth stage. The image signal output from the second image sensor 12 at the fourth stage has a waveform as shown in FIG. 5C, when the trailing end of the n-th document sheet exists on the optical path extending from the light guide 27 to the light receiving portion 12b. Meanwhile, the image signal output from the second image sensor 12 has a waveform as shown in FIG. 5B, when the trailing end of the n-th document sheet has passed through (the detection position on) the optical path extending from the light guide 27 to the light receiving portion 12b. Thus, in S410, the controller 31 checks whether there is a change between the above image signals.

The controller 31 determines whether the controller 31 has detected the trailing end of the n-th document sheet, based on the checked change in the image signal (S415). When determining that the controller 31 has not yet detected the trailing end of the n-th document sheet (S415: No), the controller 31 goes back to S410 and repeatedly performs the steps S410 and S415. Therefore, the controller 31 continues to execute S410 every one-line document feeding, until the controller 31 detects the trailing end of the n-th document sheet.

Meanwhile, in S415, when determining that the controller 31 has detected the trailing end of the n-th document sheet (S415: Yes), the controller 31 controls the operations of the first and second image sensors 11 and 12 in the second control pattern, to acquire image data of the first side of the document sheet from the first image sensor 11 and acquire image data of the second side of the document sheet from the second image sensor 12 (S420).

Namely, among the operations executed in S410, the controller 31 stops only operations necessary for detecting the trailing end of the n-th document sheet, and continuously performs the other operations in S420 as well, to acquire image data of the both sides of the n-th document sheet.

After execution of S420, the controller 31 determines whether a second-side reading end point of the n-th document sheet has reached the reading position for the second image sensor 12 (S425). The determination in S425 may be made in a manner conforming to the method for the determination in S225 or S325.

For example, a distance on the feeding path between the detection position to detect the trailing end of the document sheet passing therethrough and the reading position for the second image sensor 2 is a known value. Hence, it is possible to calculate a period of time between a time to detect the trailing end of the document sheet passing through the detection position and a time when the second-side reading end point of the document sheet, being conveyed at a predetermined feeding speed, reaches the reading position for the second image sensor 12. Therefore, in S425, it is possible to determine whether the second-side reading end point of the n-th document sheet has reached the reading position for the second image sensor 12, based on whether the above calculated period of time has elapsed after detection of the trailing end of the document sheet passing through the detection position.

When determining that the second-side reading end point of the n-th document sheet has not reached the reading position for the second image sensor 12 (S425: No), the controller 31 goes back to S420 and repeatedly performs the steps S420 and S425. Therefore, the controller 31 continues to execute S420 every one-line document feeding, until the second-side reading end position of the n-th document sheet reaches the reading position for the second image sensor 12.

Meanwhile, when determining that the second-side reading end point of the n-th document sheet has reached the reading position for the second image sensor 12 (S425: Yes), the controller 31 completes execution of S145 in FIG. 7 and then determines whether the document detecting sensor 5b is ON (S150).

When the document detecting sensor 5b is ON (S150: Yes), it means that there is a document sheet left on the ADF 5. When the document detecting sensor 5b is OFF (S150: No), it means that all document sheets set on the ADF 5 have completely been fed, and there is no document sheet left on the ADF 5.

When there is a document sheet left on the ADF 5 (S150: Yes), the controller 31 increments the counter value "n" by one (S155). Them, the controller 31 performs a process to feed a new n-th document sheet, detect a leading end of the n-th document sheet, and acquire image data of the first side of the (n−1)-th document sheet (S160).

FIG. 9B shows a specific procedure of the process to be executed in S160. When launching the process, initially, the controller 31 controls the operations of the first and second image sensors 11 and 12 in the second control pattern, to acquire image data of the first side of the document sheet from the first image sensor 11 and check a change in the image signal output from the second image sensor 12 (S510).

In S510, the controller 31 acquires image signals output from the first image sensor 11 at the first, third, and fourth stages, and stores the acquired image signals as image data into the output buffer.

Further, in S510, the controller 31 checks a change in the image signal output from the second image sensor 12 when coming into the fourth stage, in the same manner as S410. In this respect, however, unlike S410, the image signal output from the second image sensor 12 at the fourth stage in S510 changes in the same fashion as S210.

Namely, when the leading end of the n-th document sheet has not reach (the detection position on) the optical path extending from the light guide 27 to the light receiving portion 12b, the image signal output from the second image sensor 12 has a waveform as shown in FIG. 5B. Meanwhile, when the leading end of the n-th document sheet has reached (the detection position on) the optical path extending from the light guide 27 to the light receiving portion 12b, the image signal output from the second image sensor 12 has a waveform as shown in FIG. 5C. Thus, in S510, the controller 31 checks whether there is a change between the above image signals.

The controller 31 determines whether the controller 31 has detected the leading end of an n-th document sheet, based on the checked change in the image signal (S515). When determining that the controller 31 has not detected the leading end of an n-th document sheet (S515: No), the controller 31 goes back to S510 and repeatedly performs the steps S510 and S515. Thus, the controller 31 continues to execute S510 every one-line document feeding, until the controller 31 detects the leading end of the n-th document sheet.

Meanwhile, when determining that the controller 31 has detected the leading end of an n-th document sheet (S515: Yes), the controller 31 controls the operations of the first and second image sensors 11 and 12 in the second control pattern, to acquire image data of the first side of the document sheet (i.e., the (n−1)-th document sheet) from the first image sensor 11 (S520).

Namely, among the operations executed in S510, the controller 31 stops only operations necessary for detecting the leading end of the n-th document sheet, and continuously performs the other operations in S520 as well, to acquire image data of the first side of the n-th document sheet.

After execution of S520, the controller 31 determines whether the second-side reading start point of the n-th document sheet has reached the reading position for the second image sensor 12 (S525). The determination in S525 may be made in the same manner as the determination in S225.

When determining that the second-side reading start point of the n-th document sheet has not reached the reading position for the second image sensor 12 (S525: No), the controller 31 goes back to S520 and repeatedly performs the steps S520 and S525. Thus, the controller 31 continues to perform S520 every one-line document feeding, until the second-side reading start point of the n-th document sheet reaches the reading position for the second image sensor 12.

Then, when determining that the second-side reading start point of the n-th document sheet has reached the reading position for the second image sensor 12 (S525: Yes), the controller 31 completes execution of S160 in FIG. 7 and then performs a process to acquire image data of the second side of the n-th document sheet and acquire image data of the first side of the (n−1)-th document sheet (S165).

FIG. 10A shows a specific procedure of the process to be executed in S165. After launching the process, initially, the controller 31 controls the operations of the first and second image sensors 11 and 12 in the second control pattern, to acquire image data of the first side of the document sheet from the first image sensor 11 and acquire image data of the second side of the document sheet from the second image sensor 12. In S620, the controller 31 performs the same operations as S420.

After execution of S620, the controller 31 determines whether the first-side reading end point of the (n−1)-th document sheet has reached the reading position for the first image sensor 11 (S625). The determination in S625 may be made in a manner conforming to the method for the determination in S425.

Namely, for instance, it is possible to calculate a period of time between a time to detect the trailing end of the document sheet passing through the detection position and a time when the first-side reading end point of the document sheet, being conveyed at a predetermined feeding speed, reaches the reading position for the first image sensor 11. Accordingly, in S625, it is possible to determine whether the first-side reading end point of the (n−1)-th document sheet has reached the reading position for the first image sensor 11, based on whether the above calculated period of time has elapsed after detection of the trailing end of the document sheet passing through the detection position.

When determining that the first-side reading end point of the (n−1)-th document sheet has not reached the reading position for the first image sensor 11 (S625: No), the controller 31 goes back to S620 and repeatedly performs the steps S620 and S625. Thus, the controller 31 continues to execute 5620 every one-line document feeding, until the first-side reading end point of the (n−1)-th document sheet reaches the reading position for the first image sensor 11.

Then, when determining that the first-side reading end point of the (n−1)-th document sheet has reached the reading position for the first image sensor 11 (S625: Yes), the controller 31 completes execution of S165 in FIG. 7 and then goes back to S140. Thus, as long as the controller 31 determines that the document detecting sensor 5b is ON (S150: Yes), the controller 31 repeatedly executes the steps S140 to S165.

Specifically, when the controller 31 determines in S150 that the document detecting sensor 5b is ON (S150: Yes), it means that there are one or more document sheets left on the ADF 5. The document sheets left on the ADF 5 are processed on a sheet-by-sheet basis by repeated execution of the steps S140 to S165.

When the ADF 5 is brought into a state where there is no document sheet left thereon through repeated execution of the steps S140 to S165 or single-time execution of the steps S135 to S145, the document detecting sensor 5b is set OFF (S150: No).

In this case, the controller 31 performs a process to acquire image data of the first side of the n-th document sheet (S170). FIG. 10B shows a specific procedure of the process to be executed in S170. After launching the process, the controller 31 firstly controls the operations of the first and second image sensors 11 and 12 in the second control pattern, to acquire image data of the first side of the document sheet from the first image sensor 11 (S720). In S720, the controller 31 performs the same operations as S520.

After execution of S720, the controller 31 determines whether the first-side reading end point of the n-th document sheet has reached the reading position for the first image sensor 11 (S725). The determination in S725 may be made in the same manner as the determination in S625.

When determining that the first-side reading end point of the n-th document sheet has not reached the reading position for the first image sensor 11 (S725: No), the controller 31 goes back to S720 and repeatedly executes the steps S720 and S725. Thus, the controller 31 continues to execute S720 every one-line document feeding, until the first-side reading end point of the n-th document sheet reaches the reading position for the first image sensor 11.

Then, when the first-side reading end point of the n-th document sheet has reached the reading position for the first image sensor 11 (S725: Yes), it means that all document sheets have completely been read. Therefore, the controller 31 ejects the document sheet at a speed higher than the standard speed (S730). Then, at a time when certainly ejecting the document sheet, the controller 31 stops document feeding (S735). Thus, the controller 31 completes execution of S170, and completes a series of processes described above.

[Effects]

As described above, according to the MFP 1 of the embodiment, the controller 31 performs the steps S210, S410, and S510 to take control to detect the leading end and the trailing end of the document sheet passing through the detection position, using the first image sensor 11 and the second image sensor 12 that are provided to read images on the first and second sides of the document sheet.

Accordingly, the MFP 1 can be configured in a simplified manner without a special sensor for detecting that the leading end or the trailing end of the document sheet being conveyed by the ADF 5 passes through a predetermined detection position.

Further, in the MFP 1, the detection position to detect the leading end and the trailing end of the document sheet is located upstream relative to the second image sensor 12 on the feeding path. Therefore, it is possible to detect the leading end or the trailing end of the document sheet passing through the detection position before the leading end or the trailing end of the document sheet reaches (the reading position for) the second image sensor 12.

Hence, it is possible to estimate in advance a moment when the leading end or the trailing end of the document sheet reaches (the reading position for) the second image sensor 12, based on the feeding speed and a relative positional relationship between the detection position and the second image sensor 12. Further, it is possible to estimate in advance a moment when the reading start point (located in a predetermined position relative to the leading end of the document sheet) or the reading end point (located in a predetermined position relative to the trailing end of the document sheet) reaches (the reading position for) the second image sensor 12.

Thus, since it is possible to estimate the above moments, for instance, it is possible to start acquisition of image data with the second image sensor 12 based on a moment when the leading end or the reading start point of the document sheet reaches the second image sensor 12. Further, it is possible to stop the acquisition of image data with the second image sensor 12 based on a moment when the trailing end or the reading end point of the document sheet reaches the second image sensor 12.

Further, by executing S210, the controller 31 of the MFP 1 maintains the state where the light emitting portion of the first image sensor 11 emits light and the light emitting portion of the second image sensor 12 does not emit light, until the leading end of the (first) document sheet passes through the detection position.

Therefore, unlike a case to perform in parallel image reading with the second image sensor 12 and detection of the leading end or the trailing end of document sheet with the second image sensor 12, it is unnecessary to set a moment to make the light emitting portion of the second image sensor 12 emit light. Therefore, it is possible to more quickly detect the leading end of the document sheet with the second image sensor 12.

Further, by executing S410 and S510, the controller 31 of the MFP 1 can perform in parallel image reading with the second image sensor 12 and detection of the leading end or the trailing end of the document sheet with the second image sensor 12. Accordingly, compared with a configuration to perform one of the image reading with the second image sensor 12 and the detection of the leading end or the trailing end of the document sheet with the second image sensor 12 after competing the other, it is possible to more quickly perform the both (i.e., the image reading with the second image sensor 12 and the detection of the leading end or the trailing end of the document sheet with the second image sensor 12).

Further, by executing S410 and S510, the controller 31 of the MFP 1 can perform in parallel image reading with the first image sensor 11 and detection of the leading end or the trailing end of the document sheet with the second image sensor 12. Accordingly, compared with a configuration to perform one of the image reading with the first image sensor 11 and the detection of the leading end or the trailing end of the document sheet with the second image sensor 12 after competing the other, it is possible to more quickly perform the both (i.e., the image reading with the first image sensor 11 and the detection of the leading end or the trailing end of the document sheet with the second image sensor 12).

Additionally, in the MFP 1, the light guide 27 constitutes a part of the optical path. Therefore, compared with an optical path configured without any member corresponding to the light guide 27, it is possible to more easily form an optical path having a complicated shape.

Further, in the MFP 1, the light guide 27 is configured such that the lower end thereof faces the light emitting portion 11a of the first image sensor 11 in a position outside a possible maximum width of the document sheet in the main scanning direction and that the upper end thereof faces the detection position in a position within a possible minimum width of the document sheet in the main scanning direction.

Therefore, even when a document sheet with the maximum width is fed, it is possible to certainly make the light, which is emitted by the light emitting portion 11a, incident onto the lower end of the light guide 27. Further, even when a document sheet with the minimum width is fed, it is possible to certainly make the document sheet, which is passing through the detection position, block the light emitted by the upper end of the light guide 27.

Further, in the MFP 1, the second pressing member 24 is formed with the reflection surface 24 that is disposed in a position away from the feeding path. In such a configuration, the light emitted by the upper end of the light guide 27 passes through the detection position and then reaches the reflection surface 24 of the second pressing member 24. Further, the light reflected from the reflection surface 24a reaches the light receiving portion 12b of the second image sensor 12.

Therefore, when the reflection surface 24a is set at a desired angle, it is possible to dispose the light receiving portion 12b of the second image sensor 12 and the detection position in respective positions away from each other. Thus, it is possible to adjust, in a favorable manner, a period of time between a time when the leading end of the document sheet is detected in the detection position and a time when the reading start point of the document sheet reaches the reading position for the second image sensor 12.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications may be feasible.

In the aforementioned embodiment, the acquisition of the image data is started at the moment when the reading start point of the document sheet reaches the second image sensor 12 and ended at the moment when the reading end point of the document sheet reaches the second image sensor 12.

However, the acquisition of the image data using the second image sensor 12 may be started earlier than the moment when the leading end or the reading start point of the document sheet reaches the second image sensor 12. Further, the acquisition of the image data using the second image sensor 12 may be ended later than the moment when the trailing end or the reading end point of the document sheet reaches the second image sensor 12.

In those cases, when the MFP 1 is configured as described in the aforementioned embodiment, it is possible to specify a position corresponding to the leading end or the reading start point of the document sheet and a position corresponding to the trailing end or the reading end point of the document sheet. Accordingly, by cutting out a portion between the specified positions from the acquired image data, it is possible to acquire data equivalent to the image data acquired in the aforementioned embodiment.

In the aforementioned embodiment, the second image sensor 12 is controlled to emit green-colored light in S210. However, the second image sensor 12 may be controlled to emit red-colored light or blue-colored light in S210. Further, even in S210, the controller 31 may control the operations of the first image sensor 11 and the second image sensor 12 in the second control pattern. Further, in S210, the controller 31 may control, as needed, any two or three of three light sources (which emit red-colored light, green-colored light, blue-colored light, respectively) of the second image sensor 12 to emit light.

The light guide 27 may be configured with a molded component of transparent hard resin such as acrylic resin or a flexible component such as an optical fiber. Further, the light guide 27 may include a light guide mechanism with one or more mirror surfaces to introduce light in an intended direction.

In the aforementioned embodiment, the second image sensor 12 is disposed in a fixed manner at an upstream side in the feeding direction for a document sheet to be read, and the first image sensor 11 is disposed in a movable manner at a downstream side in the feeding direction. However, the first and second image sensors 11 and 12 may be disposed in respective arbitrary positions. For example, even when the first and second image sensors 11 and 12 are disposed in the same fashion as described in the aforementioned embodiment and the document sheet to be read is fed in a feeding direction opposite to that of the aforementioned embodiment, aspects of the present invention may be applied. In this respect, however, it is needed to appropriately adjust the position of the light guide 27 and a position where the document sheet blocks the optical path.

In the aforementioned embodiment, the first image sensor 11 is configured to be movable such that the MFP 1 can be used as a flatbed scanner. However, the first image sensor 11 may be configured to be unmovable. In other words, the MFP 1 may be configured as a double-side reading ADF scanner that cannot be used as a flatbed scanner.

In the aforementioned embodiment, exemplified as an image reader according to aspects of the present invention is the MFP 1 that has multiple functions as well as the image reading function. However, aspects of the present invention may be applied to an image scanner having only a single function, i.e., the image reading function.

What is claimed is:

1. An image reader comprising:
a first reading unit that comprises:
   a first light emitting portion configured to emit light onto a first side of a document sheet; and
   a first light receiving portion configured to receive the light reflected from the first side of the document sheet, so as to read out an image having a plurality of pixels arranged along a main scanning direction from the first side of the document sheet;
a second reading unit that comprises:
   a second light emitting portion configured to emit light onto a second side opposite to the first side of the document sheet; and
   a second light receiving portion configured to receive the light reflected from the second side of the document sheet, so as to read out an image having a plurality of pixels arranged along the main scanning direction from the second side of the document sheet;
a feeder configured to feed the document sheet along a feeding path in a sub scanning direction perpendicular to the main scanning direction;
a light guide unit configured to form an optical path to guide light emitted by the first light emitting portion to the second light receiving portion,
   wherein the optical path intersects the feeding path at a detection position such that the document sheet, which passes through the detection position on the feeding path, blocks the light that is guided on the optical path from the first light emitting portion to the second light receiving portion,
   wherein the light guide unit comprises a transparent member configured to transmit therethrough light incident onto a light receiving end thereof and emit the transmitted light from a light emitting end thereof, and
   wherein the transparent member is disposed such that the light emitted from the light emitting end reaches the second light receiving portion via the detection position; and
a controller configured to determine that one of a leading end and a trailing end of the document sheet passes through the detection position, in response to detecting a change in a light receiving state of the second light receiving portion when the document sheet passes through the detection position in a first state where the first light emitting portion is set to an ON state to emit light and the second light emitting portion is set to an OFF state so as not to emit light.

2. The image reader according to claim 1,
wherein before starting image reading with one of the first reading unit and the second reading unit, the controller maintains the first state where the first light emitting portion is set to an ON state to emit light and the second light emitting portion is set to an OFF state so as not to emit light until the controller determines that the leading end of the document sheet passes through the detection position.

3. The image reader according to claim 1,
wherein the controller is further configured to set the second light emitting portion to the ON state or OFF state,
wherein the controller is configured to control the second reading unit to perform image reading when the second light emitting portion is turned to the ON state, and
wherein the controller is configured to, when the second light emitting portion is turned to the OFF state, set the first light emitting portion to the ON state, and determine that one of the leading end and the trailing end of the document sheet passes through the detection position in response to detecting the change in the light receiving state of the second light receiving portion.

4. The image reader according to claim 3,
wherein the controller is configured to, when the second light emitting portion is turned to the OFF state, set the first light emitting portion to the ON state, and control the first reading unit to perform image reading.

5. The image reader according to claim 1,
wherein the transparent member is disposed such that the light receiving end thereof faces the first light emitting portion outside a maximum width of the document sheet in the main scanning direction and that the light emitting end thereof faces the detection position within a minimum width of the document sheet in the main scanning direction.

6. The image reader according to claim 1, further comprising a pressing member disposed in such a position as to face the second reading unit across the feeding path,
wherein the pressing member is configured to press the document sheet toward the second reading unit,
wherein the pressing member comprises a reflection surface formed in a position away from the feeding path, and
wherein the reflection surface is configured such that the light emitted from the light emitting end of the transparent member reaches the reflection surface via the detection position and that the light reflected from the reflection surface reaches the second light receiving portion.

7. The image reader according to claim 1, wherein the detection position is located upstream, in the sub scanning direction on the feeding path, relative to a first reading position where the first reading unit reads the first side of the document sheet and a second reading position where the second reading unit reads the second side of the document sheet.

8. An image reader comprising:
a first reading unit that comprises:
   a first light emitting portion configured to emit light onto a first side of a document sheet; and
   a first light receiving portion configured to receive the light reflected from the first side of the document sheet, so as to read out an image having a plurality of pixels arranged along a main scanning direction from the first side of the document sheet;
a second reading unit that comprises:
   a second light emitting portion configured to emit light onto a second side opposite to the first side of the document sheet; and
   a second light receiving portion configured to receive the light reflected from the second side of the document sheet, so as to read out an image having a plurality of pixels arranged along the main scanning direction from the second side of the document sheet;
a feeder configured to feed the document sheet along a feeding path in a sub scanning direction perpendicular to the main scanning direction;
a light guide unit configured to form an optical path to guide light emitted by the first light emitting portion to the second light receiving portion,
  wherein the optical path guides the light emitted by the first light emitting portion across the feeding path at a detection position located upstream, in the sub scanning direction on the feeding path, relative to a reading position where the second reading unit reads the second side of the document sheet, and again across the feeding path at another position downstream, in the sub scanning direction on the feeding path, relative to the detection position, to the second light receiving portion,
  wherein the light guide unit comprises a transparent member configured to transmit therethrough light incident onto a light receiving end thereof and emit the transmitted light from a light emitting end thereof, and
  wherein the transparent member is disposed such that the light emitted from the light emitting end reaches the second light receiving portion via the detection position; and
a controller configured to determine that one of a leading end and a trailing end of the document sheet passes through the detection position, in response to detecting a change in a light receiving state of the second light receiving portion when the document sheet passes through the detection position in a first state where the first light emitting portion is set to an ON state to emit light and the second light emitting portion is set to an OFF state so as not to emit light.

9. The image reader according to claim 8,
wherein before starting image reading with one of the first reading unit and the second reading unit, the controller maintains the first state where the first light emitting portion is set to an ON state to emit light and the second light emitting portion is set to an OFF state so as not to emit light until the controller determines that the leading end of the document sheet passes through the detection position.

10. The image reader according to claim 8,
wherein the controller is further configured to set the second light emitting portion to the ON state or OFF state,
wherein the controller is configured to control the second reading unit to perform image reading when the second light emitting portion is turned to the ON state, and
wherein the controller is configured to, when the second light emitting portion is turned to the OFF state, set the first light emitting portion to the ON state, and determine that one of the leading end and the trailing end of the document sheet passes through the detection position in response to detecting the change in the light receiving state of the second light receiving portion.

11. The image reader according to claim 10,
wherein the controller is configured to, when the second light emitting portion is turned to the OFF state, set the first light emitting portion to the ON state, and control the first reading unit to perform image reading.

12. The image reader according to claim 8,
wherein the transparent member is disposed such that the light receiving end thereof faces the first light emitting portion outside a maximum width of the document sheet in the main scanning direction and that the light emitting end thereof faces the detection position within a minimum width of the document sheet in the main scanning direction.

13. The image reader according to claim 8, further comprising a pressing member disposed in such a position as to face the second reading unit across the feeding path,
wherein the pressing member is configured to press the document sheet toward the second reading unit,
wherein the pressing member comprises a reflection surface formed in a position away from the feeding path, and
wherein the reflection surface is configured such that the light emitted from the light emitting end of the transparent member reaches the reflection surface via the detection position and that the light reflected from the reflection surface reaches the second light receiving portion.

* * * * *